United States Patent
Rivers et al.

(10) Patent No.: US 8,236,413 B2
(45) Date of Patent: Aug. 7, 2012

(54) COMBINATION STRUCTURAL SUPPORT AND THERMAL PROTECTION SYSTEM

(75) Inventors: H. Kevin Rivers, Hampton, VA (US);
Stephen J. Scotti, Grafton, VA (US);
Lynn M. Bowman, Chesapeake, VA (US); Max L. Blosser, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 735 days.

(21) Appl. No.: 12/166,852

(22) Filed: Jul. 2, 2008

(65) Prior Publication Data

US 2010/0000176 A1    Jan. 7, 2010

(51) Int. Cl.
*B32B 27/04* (2006.01)
(52) U.S. Cl. .................. 428/297.4; 244/159.1
(58) Field of Classification Search ............ 428/297.4, 428/298.7, 299.1, 293.4, 300.1, 294.1; 52/741.3, 52/783.1, 799.11; 244/159.1
See application file for complete search history.

(56) References Cited

U.S. PATENT DOCUMENTS

| | | | |
|---|---|---|---|
| 4,804,571 A * | 2/1989 | Jouffreau | 428/77 |
| 5,162,136 A | 11/1992 | Blum et al. | |
| 5,294,425 A | 3/1994 | Schwab | |
| 5,824,404 A | 10/1998 | Brown et al. | |
| 5,935,679 A | 8/1999 | Petrisko et al. | |
| 5,984,055 A | 11/1999 | Strasser et al. | |
| 6,062,351 A | 5/2000 | Strasser et al. | |
| 6,264,045 B1 | 7/2001 | Wilson et al. | |
| 6,451,416 B1 | 9/2002 | Holowczak et al. | |
| 6,844,091 B2 * | 1/2005 | Denham et al. | 428/697 |
| 6,852,271 B1 | 2/2005 | DiChiara, Jr. | |
| 6,919,121 B2 | 7/2005 | Stowell et al. | |
| 6,955,853 B1 | 10/2005 | Tran et al. | |
| 7,118,802 B2 * | 10/2006 | Simon et al. | 428/293.4 |
| 7,281,688 B1 * | 10/2007 | Cox et al. | 244/159.1 |
| 2005/0230029 A1 * | 10/2005 | Vaidyanathan et al. | 156/89.11 |
| 2006/0234579 A1 * | 10/2006 | Adam et al. | 442/136 |
| 2007/0172659 A1 | 7/2007 | Shao | |

* cited by examiner

*Primary Examiner* — Brian Glessner
*Assistant Examiner* — Daniel Kenny
(74) *Attorney, Agent, or Firm* — Andrea Z. Warmbier; Robin W. Edwards

(57) ABSTRACT

A combination structural support and thermal protection system is provided. A cured preceramic polymer matrix reinforced with carbon fibers can be used alone or in a multiple component system.

25 Claims, 2 Drawing Sheets

COMBINATION STRUCTURAL SUPPORT AND THERMAL PROTECTION SYSTEM

ORIGIN OF THE INVENTION

This invention was made by employees of the United States Government and may be manufactured and used by or for the Government of the United States of America for governmental purposes without the payment of any royalties thereon or therefore.

FIELD OF THE INVENTION

This invention relates to thermal protection systems. More specifically, the invention is a combination structural support and thermal protection system that maintains its structural integrity in the face of an extreme heat event.

DESCRIPTION OF THE RELATED ART

State-of-the-art thermal protection systems typically include a support or carrier structure with thermal protection material/elements coupled to the carrier structure and exposed to an ambient, high-temperature environment. The carrier structure is generally made from a low-temperature material such as aluminum, titanium, or one of many polymer matrix composites. These types of systems function well as long as the structural integrity of the thermal protection material/elements is maintained. However, if the thermal protection material/elements fail or are damaged (e.g., due to an impact, chemical breakdown, etc.), the underlying carrier structure can overheat and fail as the temperature thereof increases in the region of the thermal protection material/element failure. This type of situation can result in a catastrophic event.

SUMMARY OF THE INVENTION

Accordingly, it is an object of the present invention to provide a thermal protection system that provides structural support.

Still another object of the present invention is to provide a combination structural support and thermal protection system that maintains structural and thermal protection integrity even when damaged.

Other objects and advantages of the present invention will become more obvious hereinafter in the specification and drawings.

In accordance with the present invention, a combination structural support and thermal protection system is based on a cured preceramic polymer matrix reinforced with carbon fibers that can be used alone or in a multiple component system. For example, one or more walls can be defined by the cured preceramic polymer matrix reinforced with carbon fibers. The wall(s) can be protected by a layer or layers of thermal protection materials. The wall(s) can form a primary structure, or a support structure that is coupled to a primary structure. Thermal insulation can be disposed between a single wall and the primary structure or between any two of the walls.

DETAILED DESCRIPTION OF THE INVENTION

Figure 1:
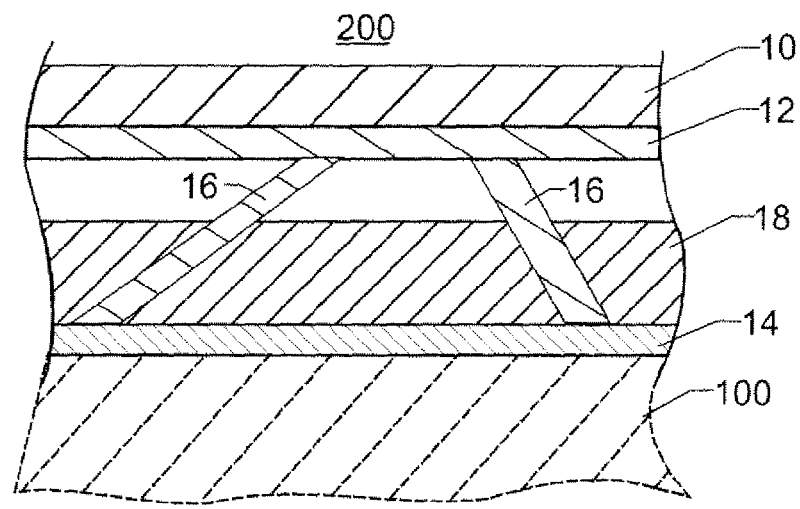
FIG. 1 is a cross-sectional view of a combination structural support and thermal protection system in accordance with an embodiment of the present invention.

The present invention is a system that provides both structural support and thermal protection attributes in a "fail safe" manner. That is, the system provides both structural support and thermal protection even when the system sustains damage. The system can be used in a wide variety of static and vehicular structures without departing from the scope of the present invention. For example, the system of the present invention can be incorporated into a building such that the building remains structurally sound during a fire event. In terms of a vehicular structure, the present invention can be used in the construction of a spacecraft's re-entry heat shield. While the realization of the present invention will likely be different depending on the particular application, it is to be understood that the essential novelty described herein will be present in each such realization.

The combination structural support and thermal protection system is based on a cured preceramic polymer matrix that is reinforced with carbon fibers. The preceramic polymer matrix is formed from one of the specialized and known organic polymer materials that is capable of being processed to a ceramic state. Suitable examples include the silizane family of organic polymers, including polysilizane (or polysiloxane) and polycarbosilizane, and the Starfire® and ATK®-COI families of resin systems, although the present invention is not limited thereto. The selected organic polymer is used as the matrix of a composite material that has been reinforced with carbon fibers and then cured to its polymerized, preceramic state. The length and/or amount of carbon fibers are not limitations of the present invention, as these selections can be tailored for a specific application. Either continuous or chopped fibers can be used, with suitable fiber lengths generally of approximately 0.25 in. to approximately 2.0 in., although such lengths are not a limitation of the present invention. The carbon fibers can also have an interfacial coating applied thereto prior to their inclusion in the polymer matrix. Suitable interfacial coatings include silicon carbide, zirconia and hafnium carbide, but the present invention is not limited thereto. The fabrication of the resultant cured preceramic polymer matrix reinforced with carbon fibers is well understood in the art. However, the existing art only considers this material to be a "stepping stone" to an ultimate product. That is, prior to using this material in a product, the existing art processes this material at high temperatures to convert the preceramic to a ceramic.

In contrast, the present invention contemplates the formation of an ultimate structure using the cured preceramic polymer matrix reinforced with carbon fibers. This novel approach to static or vehicular construction provides a breakthrough in structural integrity in the face of a high-temperature event such as a fire, high-temperature chemical reaction, heat generated during atmospheric re-entry, etc. More specifically, when a structure made from the present invention's cured preceramic polymer matrix reinforced with carbon fibers is exposed to extremely high temperatures (e.g., in excess of 1000° F.), the structure is steadily converted to a ceramic matrix reinforced with carbon fibers that retains significant strength to withstand large structural loads. This will allow the structure to survive the catastrophic event that caused the generation of the extreme heat. Further, since the structure will not fail mechanically, the present invention remains in place to continue to provide thermal protection as well.

During conversion from a preceramic state to a ceramic state, the polymer matrix loses some density. To combat this, the present invention's preceramic polymer matrix can incorporate ceramic particles. The ceramic particles are typically included in the polymer matrix prior to its reinforcement with carbon fibers and the curing thereof to its preceramic state. The particular ratio of polymer matrix-to-ceramic particles is not a limitation of the present invention as this ratio can be optimized to obtain acceptable densities and strengths.

By way of non-limiting examples, two embodiments of the present invention will be described with the aid of FIGS. 1 and 2. Both embodiments use the present invention as a structural support/carrier for a thermal protector 10 designed to protect a building or vehicle structure 100 from heat damage. Structure 100 is illustrated by phantom lines to indicate that structure 100 is not a limitation of the present invention. Thermal protector 10 is any one or more layers of insulation or ablator materials, spray-on coating(s), combinations thereof, etc. In general, thermal protector 10 is exposed to an ambient environment 200 and is designed to protect structure 100 in the face of a high-temperature event occurring in ambient environment 200. While the illustrated portion of structure 100 is planar, the present invention can also be readily adapted to work with shaped structures as will be appreciated by one of ordinary skill in the art.

Referring now to FIG. 1, the combination structural support and thermal protection system is defined by (i) spaced-apart walls 12 and 14, and (ii) coupling support members 16 that tie or couple walls 12 and 14 to one another. Support members 16 can be, for example, uniaxial members or struts, planar webs, honeycomb core members, etc., without departing from the scope of the present invention. Note that while only two spaced-apart walls are illustrated, more than two spaced-apart walls coupled together by support members can be used without departing from the scope of the present invention. This system is disposed between thermal protector 10 and structure 100. Walls 12/14 and support members 16 are made from one of the above-described versions of a cured preceramic polymer matrix reinforced with carbon fibers, i.e., with or without the interfacial coating of the carbon fibers, with or without ceramic particles in the polymer matrix, etc. Each of walls 12/14 and support members 16 can be fabricated from the same or different versions of the cured preceramic polymer matrix reinforced with carbon fibers without departing from the scope of the present invention. The thickness of walls 12 and 14 are defined by the structural application, generally ranging from approximately 0.05 in. to 0.5 in. thick although other thicknesses may be suitable for specific applications. If desired, the region between walls 12 and 14 can be completely or partially filled (as shown in FIG. 1) with thermal insulation 18, the choice of which is not a limitation of the present invention. While the insulation material will depend on the particular thermal requirements, suitable materials may include Saffil®, including lightweight high temperature opacified Saffil®, and multilayer insulations (MLI). Thermal insulation 18 can completely or partially encase support members 16.

In operation, if thermal protector 10 is damaged (e.g., broken away, cracked, chipped, ablated, etc.) and a high-temperature event occurs in ambient environment 200, the portion of wall 12 exposed to the extreme heat converts to its ceramic state. As the extreme heat penetrates wall 12, support members 16 and (eventually) wall 14 also convert to the ceramic state. In this embodiment, walls 12/14 and support members 16 provide continuous structural and thermal protection even when thermal protector 10 is damaged. Thermal protection is enhanced by the inclusion of thermal insulation 18 which remains fully protected by walls 12 and 14.

Figure 3A:
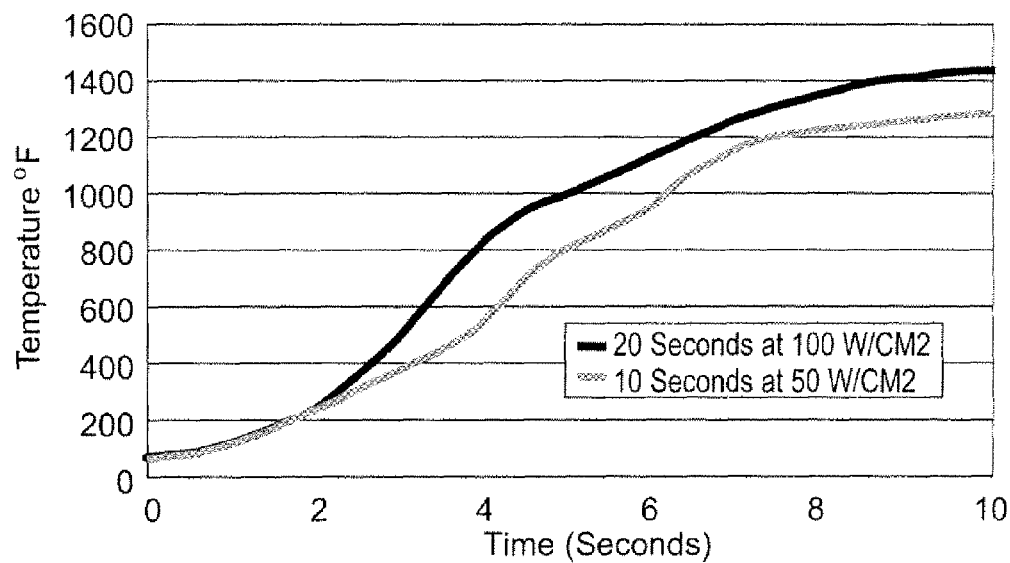
FIGS. 3A and 3B illustrate time and temperature data for tests of a preceramic polymer matrix composite material 0.062 in. thick and 0.125 in. thick, respectively.
Figure 3B:
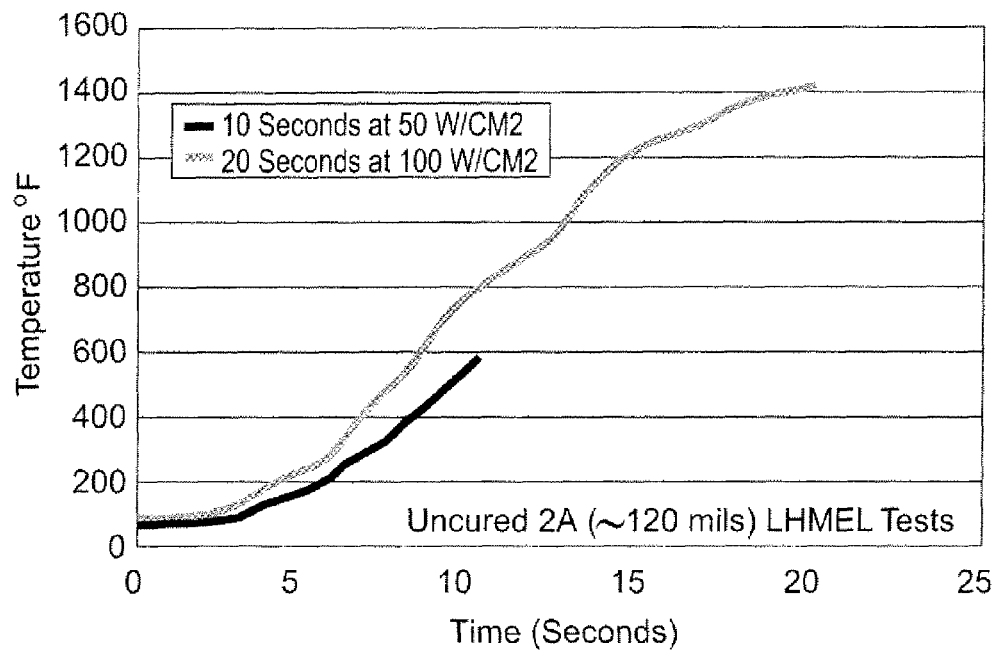

Tests of the present invention have shown that the conversion of support members 16 and wall 14 to the ceramic state is steady, thereby insuring structural integrity during and after the conversion. For example, a preceramic polymer matrix composite matrix material was fabricated (square weave) using standard polymer matrix construction. The material was exposed to 50 W/cm2 for 10 seconds and 100 W/cm2 for 20 seconds. For the 100 W/cm2 heating, temperatures in the material reached approximately 1400 F. The material quickly converted to a ceramic matrix composite. Both 0.125 in. and 0.062 in. thick materials were tested. The materials successfully converted into ceramic matrix composites that retained structural integrity. Time and temperature data are illustrated in FIGS. 3A and 3B for the 0.062 in. and 0.125 in. thick materials, respectively.

Figure 2:
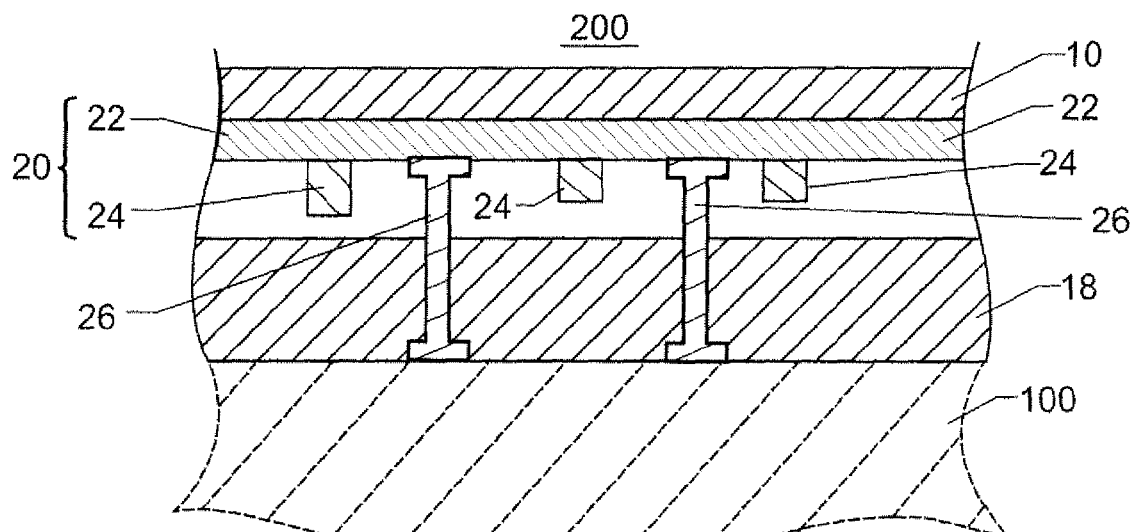
FIG. 2 is a cross-sectional view of a combination structural support and thermal protection system in accordance with another embodiment of the present invention.

Referring now to FIG. 2, another embodiment of the present invention is defined by a stiff wall 20 made one from the above-described versions of a cured preceramic polymer matrix reinforced with carbon fibers. Stiff wall 20 is disposed between thermal protector 10 and structure 100. By way of example, stiff wall 20 includes a wall 22 and a plurality of stiffening ribs 24 coupled thereto. However, it is to be understood that a stiff wall can be fabricated from the cured preceramic polymer matrix reinforced with carbon fibers in a variety of other ways without departing from the scope of the present invention. Stiff wall 20 is coupled to and spaced apart from structure 100 by supports 26 (e.g., I-beam supports) made from any suitable support material. The choice of support material depends on the temperature and strength requirements. Suitable examples include inconel, titanium, carbon-silicone carbide, aluminum and polymer matrix composites. As in the previous embodiment, thermal insulation 18 can be provided completely or partially in the region between stiff wall 20 and structure 100. In operation, if thermal protector 10 is damaged and a high-temperature event occurs in ambient environment 200, the portion of stiff wall 20 exposed to the extreme heat converts to its ceramic state. Structural integrity and thermal protection are thereby guaranteed by stiff wall 20.

The advantages of the present invention are numerous. Static and vehicular structures can now be constructed to provide "fail safe" structural support and thermal protection in the face of extreme heat events. A cured-preceramic-polymer-matrix-reinforced-with-carbon-fibers structure can be used by itself or as a carrier for a thermal protector. When used in conjunction with a thermal protector, the present invention provides back-up structural integrity and thermal protection even in the face of thermal protector damage.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A combination structural support and thermal protection system, comprising:
   a first wall and a second wall,
   a coupling support member coupling said first wall and second wall, wherein said first wall, said second wall, and said coupling support member comprise a cured preceramic polymer matrix reinforced with carbon fibers; and a thermal protector and a structure, wherein said first wall, said second wall, and said coupling support member are disposed between said thermal protector and said structure.

2. The combination structural support and thermal protection system as in claim 1, further comprising ceramic particles dispersed in said cured preceramic polymer matrix.

3. The combination structural support and thermal protection system as in claim 1, further comprising an interfacial coating on said carbon fibers.

4. The combination structural support and thermal protection system as in claim 2, further comprising an interfacial coating on said carbon fibers.

5. The combination structural support and thermal protection system as in claim 1, wherein said structure comprises a vehicular structure.

6. The combination structural support and thermal protection system as in claim 1, further comprising thermal insulation disposed between said first wall and said second wall.

7. The combination structural support and thermal protection system as in claim 1, said system further comprising stiffening ribs, wherein said stiffening ribs comprise a cured preceramic polymer matrix reinforced with carbon fibers.

8. The combination structural support and thermal protection system as in claim 7, said stiffening ribs adapted to couple said first wall and said second wall in a spaced-apart fashion.

9. The combination structural support and thermal protection system as in claim 8, further comprising thermal insulation disposed between said first wall and said second wall.

10. A combination structural support and thermal protection system, comprising
a plurality of walls and a plurality of coupling support members comprising a cured preceramic polymer matrix reinforced with interfacially-coated carbon fibers and having ceramic particles dispersed in said cured preceramic polymer matrix; and
a thermal protector and a structure, wherein said plurality of walls and said plurality of coupling support members are disposed between said thermal protector and said structure.

11. The combination structural support and thermal protection system as in claim 10, wherein said are disposed between said plurality of walls and couple said plurality of walls.

12. The combination structural support and thermal protection system as in claim 11, further comprising thermal insulation disposed between said plurality of walls.

13. The combination structural support and thermal protection system as in claim 10, wherein said support members comprise stiffening ribs.

14. The combination structural support and thermal protection system as in claim 13, said stiffening ribs adapted to couple said plurality of walls in a spaced-apart fashion.

15. The combination structural support and thermal protection system as in claim 14, further comprising thermal insulation disposed between said plurality of walls.

16. A combination structural support and thermal protection system, comprising:
a first wall and a second wall comprising a cured preceramic polymer matrix reinforced with carbon fibers;
a support member adapted to couple said first wall to said second wall in a spaced-apart fashion, wherein a region is defined between said first wall and said second wall; and
thermal insulation disposed at least partially in said region.

17. The combination structural support and thermal protection system as in claim 16, further comprising ceramic particles dispersed in said cured preceramic polymer matrix.

18. The combination structural support and thermal protection system as in claim 16, further comprising an interfacial coating on said carbon fibers.

19. The combination structural support and thermal protection system as in claim 17, further comprising an interfacial coating on said carbon fibers.

20. The combination structural support and thermal protection system as in claim 16 wherein said support member comprises cured preceramic polymer matrix reinforced with carbon fibers, and couples said first wall to said second wall.

21. The combination structural support and thermal protection system as in claim 20, wherein said thermal insulation at least partially encases said support member.

22. The combination structural support and thermal protection system as in claim 16, further comprising stiffeners made from said cured preceramic polymer matrix reinforced with carbon fibers, said stiffeners being coupled to said first wall and said second wall.

23. The combination structural support and thermal protection system as in claim 16, further comprising a thermal protector coupled to said first wall and adapted to be exposed to an ambient environment, wherein said first wall is disposed between said thermal protector and said second wall.

24. The combination structural support and thermal protection system as in claim 17, further comprising a thermal protector coupled to said first wall and adapted to be exposed to an ambient environment, wherein said first wall is disposed between said thermal protector and said second wall.

25. The combination structural support and thermal protection system as in claim 19, further comprising a thermal protector coupled to said first wall and adapted to be exposed to an ambient environment, wherein said wall is disposed between said thermal protector and said second wall.

\* \* \* \* \*